United States Patent Office 3,590,015
Patented June 29, 1971

3,590,015
NON-FOAMING AMIDE INTERPOLYMER COATING COMPOSITIONS
Erwin J. Kapalko, Delaware, Ohio, assignor to
PPG Industries, Inc., Pittsburgh, Pa.
No Drawing. Filed May 23, 1968, Ser. No. 731,642
Int. Cl. C08f 45/52
U.S. Cl. 260—28.5                                12 Claims

ABSTRACT OF THE DISCLOSURE

Coating compositions in which the vehicle is based upon an interpolymer of an unsaturated carboxylic acid amide and one or more other ethylenic monomers have a greatly reduced tendency to foam when there is included in the composition a small amount of aliphatic hydrocarbon wax modified with polyalkylene oxide. Such non-foaming characteristics permit the application of the coating composition by electrostatic spray systems or flow-coating techniques without coating defects caused by bubble formation.

---

Various compositions comprising interpolymers of unsaturated carboxylic acid amides, and especially aldehyde-modified and etherified interpolymers of such amides with other ethylenically unsaturated monomers, have been utilized extensively in coatings. A number of such interpolymers which have found wide acceptance in the coatings field are disclosed, for example, in U.S. Pat. No. 3,037,963. These interpolymers are employed alone or, more usually, in combination with other resins, and are utilized as clear films or as resinous vehicles for primers, enamels and other thermosetting compositions. When so used, such compositions provide highly desirable coatings having excellent properties, including, for instance, good adhesion, chemical resistance, mar resistance, etc.

However, although compositions comprising these interpolymers provide coatings having outstanding overall properties which make them highly desirable for many applications, for some uses they have certain disadvantages. For example, when they are applied by electrostatic spraying or by flow-coating, they often tend to foam and bubble. In addition to the operating problems arising from such foaming, some of the bubbles which form are deposited on the article being coated; these bubbles then break during curing of the coating thereby causing defects in the paint film.

It has now been found that foaming of coating compositions based upon the aforesaid amide interpolymers are greatly reduced by including in the composition a small amount of polyalkylene oxide-modified aliphatic hydrocarbon wax. The use of such wax effectively prevents defects arising from bubble formation and permits the use of these compositions with application equipment such as described above. It is important to note that the presence of the wax provides the foregoing improvement without detracting from the other properties of these coating compositions; in fact, in some instances a degree of improvement in certain properties is achieved.

The amide polymer component of the compositions of this invention can be any aldehyde-modified polymer of an unsaturated carboxylic acid amide; the aldehyde-modified interpolymer is preferably at least partially etherified. Aldehyde-modified amide polymers are obtained by polymerizing an unsaturated amide and at least one ethylenically unsaturated monomer and reacting the initial product of the polymerization with an aldehyde. Etherification is carried out by further reaction of the aldehyde-modified interpolymer with an alcohol. Alternatively, aldehyde-modified interpolymers are produced by interpolymerizing an aldehyde-modified amide, such as an alkylol amide, which may be then etherified, or by employing an N-alkoxyalkyl amide.

In either case, the aldehyde-modified etherified amide polymer contains amido groups having a hydrogen atom replaced by the structure:

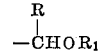

where R is hydrogen or an alkyl radical and $R_1$ is hydrogen or an organic radical.

Methods for producing N-alkoxyalkyl-substituted unsaturated carboxylic acid amides, such as N-butoxymethyl acrylamide are disclosed in U.S. Pat. Nos. 3,079,434 and 3,087,965. When these and similarly substituted unsaturated carboxylic acid amides are polymerized, the resulting reaction product contains the aforesaid structure without any further treatment.

If, however, the unsaturated carboxylic acid amide does not contain such a structure, i.e., an unsubstituted amide is employed, the resulting amide polymer should be reacted with an aldehyde whereby such structure in which $R_1$ is hydrogen is produced by reaction of the aldehyde with an amido hydrogen atom to produce a hydroxyorgano group. When the aldehyde-modified product is also reacted with an alcohol, etherification of the hydroxyorgano groups by the alcohol takes place.

It is desirable to etherify at least part, and in many cases at least about half, of the hydroxyorgano groups of those amide interpolymers produced from unsubstituted or alkylol amides. Otherwise, problems of storage stability or premature gelation and flexibility of the coating may be encountered.

After etherification, the amide polymer contains amido groups having a hydrogen atom replaced by the structure:

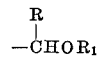

where R is hydrogen when the aldehyde employed is formaldehyde and an alkyl radical when other aliphatic aldehydes are used. $R_1$ represents the radical derived by removing a hydroxyl group from the etherifying alcohol, i.e., an organic radical, or in those groups not etherified, represents hydrogen. $R_1$ in the etherified groups can be, for example, alkyl or aryl. The terms "alkyl" and "aryl" as employed herein, are to be construed broadly; the groups represented by $R_1$ may include other substituents and functional groups which do not affect the properties of the product. Thus, $R_1$ may include unsaturated linkages, ether linkages, halogens and other substituents, or it may be cyclic.

Satisfactory products may in some instances be obtained with only a very small part of the hydroxyorgano groups having been etherified, in some instances 5 percent or less, but as mentioned, it is usually desirable that at least about 50 percent of the hydroxyorgano groups be etherified. Butanol is a preferred alcohol for use in the etherification, although any monohydric alcohol, such as methanol, ethanol, propanol, pentanol, octanol, decanol, and other alkanols containing up to about 20 or more carbon atoms, may also be employed, as may aromatic alcohols, such as benzyl alcohol; or cyclic alcohols, such as cyclohexanol; or the monoethers of glycols, such as butyl Cellosolve (ethylene glycol monobutyl ether), butyl Carbitol (diethylene glycol monobutyl ether), and other Cellosolves and Carbitols; or substituted alcohols, such as 3-chloropropanol.

While either acrylamide or methacrylamide is preferred for use in forming the interpolymer component, any polymerizable unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid and esters thereof, and amide derivatives such as N-carbamyl maleimide, may also be utilized. Preferably, the interpolymer should contain from about 2 to about 50 percent by weight of the amide, the balance being the other ethylenic monomer or monomers.

At least one other unsaturated monomer is interpolymerized with the unsaturated carboxylic acid amide; any polymerizable ethylenically unsaturated monomer can be so utilized. Such monomers include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. The interpolymer compositions described in U.S. Pats. Nos. 2,978,437 and 3,307,963 are excellent examples of the preferred type of amide polymers utilized in the instant invention, and the many unsaturated compounds disclosed therein illustrate the numerous monomers which can be interpolymerized along with the amide. The polymerization reaction to form the amide interpolymer is also described in the aforesaid patents, and is ordinarily carried out using a free-radical initiator, such as a peroxygen type catalyst, and a mercaptan or other chain-stopping agent.

When necessary to produce the desired structures, the amide groups are reacted with an aldehyde, preferably in the presence of an alcohol and a mild acid catalyst, such as maleic anhydride. Formaldehyde, or a formaldehyde-yielding substance, is greatly preferred, but other aldehydes, such as acetaldehyde, butyraldehyde, and the like, can be used. It is ordinarily preferred to utilize about 2 equivalents of aldehyde for each amide group present in the interpolymer, although the ratio may be as high as 3.0 equivalents or as low as about 0.2 equivalent of aldehyde for each amide group.

The modified hydrocarbon wax employed is an aliphatic hydrocarbon wax modified with an alkylene oxide, such as ethylene oxide or propylene oxide, to contain polyalkylene oxide groups. Such materials are available commercially; they can be produced, for example, by epoxidizing residual unsaturation of a natural or synthetic aliphatic hydrocarbon wax and then further reacting with alkylene oxide. The proportion of polyalkylene oxide in the modified wax can vary, but in most instances is between about 3 percent and about 40 percent of the total weight and preferably between about 10 percent and about 25 percent. Ethylene oxide-modified waxes are preferred.

The proportions of the modified hydrocarbon wax in the coating composition can be varied considerably; very small amounts, e.g., as low as 0.05 percent, based on resin solids content are effective. The optimum amount employed depends upon the components of the coating composition, e.g., solvents, additives and the particular interpolymer employed, and also upon the manner in which the composition is to be applied. Generally speaking, there is employed from about 0.08 percent to about 1 percent of the wax, based upon the total weight of the resinous components, although there does not appear to be any upper limit and amounts as high as 5 percent or higher can be used.

In addition to the amide interpolymer and the modified hydrocarbon wax, the coating compositions herein ordinarily contain several additive components to provide the desired overall combination of properties. Such additive materials are those ordinarily utilized with the amide interpolymers of the class herein and these can include, for instance, epoxy resins, amine resins, methylol phenol ether compositions, and other resinous materials, as well as various plasticizers and materials to decrease the required curing temperatures, such as acids or adducts of maleic anhydride with hydroxyl-containing polymers.

Various pigments are also usually included to provide colored finishes as desired.

The coating compositions herein can be applied by any conventional application method, such as by electrostatic or conventional spraying, flow coating, roll coating, brushing and the like, but the advantages derived from the use of the modified wax as described herein are most important where the application tends to produce foaming and bubble formation. Flow-coating and electrostatic spraying, e.g. using Ransbury bell equipment, are examples of such methods. Ordinarily, the composition includes one or more solvents, and the choice of solvents and the concentration of the resinous components in the solvent mixture are chosen with reference to the manner in which the composition is to be applied. The compositions are usually applied to metal substrates such as sheet aluminum, phosphatized steel, copper, etc., but can also be utilized on other materials, such as wood, glass, plastics and the like.

After application, the compositions are ordinarily dried and cured by baking at elevated temperatures to produce a hard, infusible film. The baking schedules employed also depend upon the nature of the particular composition, the nature of the substrate, and the manner in which it is to be used. The inclusion of an acid monomer in the amide polymer, or addition of various agents will lower the effective curing temperature. Generally speaking, baking temperatures of at least 200° F. and preferably 300° F. are employed, and the ordinary baking schedule is between 325° F. and 425° F. for 10 to 40 minutes. In some cases, curing can be carried out by other techniques not requiring such elevated temperatures.

Set forth below are several examples giving the compositions of several amide interpolymers that can be employed in the invention. These amide interpolymers are produced by known procedures. In a typical procedure, the reactive monomers are charged into a reaction vessel along with solvent, a mercaptan or other chain-modifying agent, and catalyst. The amount of catalyst added initially is generally 1 percent by weight of the reactive monomers. This mixture is refluxed for 8 hours, with 0.5 percent portions of additional catalyst being added after the second, fourth, sixth and eighth hours. There are then added an aldehyde and an alcohol (usually butyl Formcel, which is a 40 percent solution of formaldehyde in n-butanol), along with maleic anhydride or a similar mild acid catalyst and additional solvent. This mixture is then refluxed for 3 hours while removing water azeotropically. The product is cooled and sufficient solvent added to produce a solution of the desired non-volatile solids content. (In the examples and throughout the specification all parts and percentages are based upon weight and non-volatile solids content, unless otherwise indicated.)

EXAMPLE A

The following monomers are employed in this example:

| | Parts by weight |
|---|---|
| Acrylamide | 35.1 |
| Methacrylic acid | 8.8 |
| Styrene | 212.4 |
| Methyl methacrylate | 94.8 |

These are reacted in the presence of a total of 10.5 parts of cumene hydroperoxide and 10.5 parts of tertiary dodecyl mercaptan. The polymer is modified by reaction with 74.4 parts of butyl Formcel and 0.93 part of maleic anhydride. The product has a Gardner-Holdt viscosity of T to U and a solids content of 51 percent, in a solvent mixture containing 25 percent butanol, 25 percent xylene and 50 percent toluene.

EXAMPLE B

An interpolymer is produced from the following reactive monomers:

| | Parts by weight |
|---|---|
| Acrylamide | 30.0 |
| Styrene | 262.5 |
| Methacrylic acid | 7.5 |

The above are polymerized using a total of 9 parts of cumene hydroperoxide catalyst and 3.75 parts of tertiary dodecyl mercaptan, and the polymer is further reacted with 63.6 parts of butyl Formcel in the presence of 0.8 part of maleic anhydride. The polymer solution produced has a solids content of 50 percent and a Gardner-Holdt viscosity of V to W, in a solvent mixture of 32.5 percent butanol, 22.5 percent xylene and 45.0 percent toluene.

EXAMPLE C

The monomers employed in making the interpolymer of this example are as follows:

| | Parts by weight |
|---|---|
| Acrylamide | 10.0 |
| Styrene | 87.5 |
| Methacrylic acid | 2.5 |

The polymer is produced using 3.5 parts of cumene hydroperoxide and 3 parts of tertiary dodecyl mercaptan, and is further reacted with 21.2 parts of butyl Formcel in the presence of 0.27 part of maleic anhydride. The product has a solids content of 49 percent and a Gardner-Holdt viscosity of Q+, in a solvent mixture of 32.5 percent butanol, 22.5 percent xylene and 45 percent high boiling aromatic naphtha (boiling range 187–205° C.).

EXAMPLE D

In this example, the following monomers are employed:

| | Parts by weight |
|---|---|
| Acrylamide | 27.0 |
| Methacrylic acid | 6.75 |
| Hydroxyethyl methacrylate | 13.5 |
| Methyl methacrylate | 65.0 |
| Styrene | 104.0 |
| 2-ethyl hexyl acrylate | 54.0 |

A total of 8.1 parts of cumene hydroperoxide and 4.1 parts of tertiary dodecyl mercaptan are utilized in carrying out the reaction, and the polymer produced is modified by reaction with 57.0 parts of butyl Formcel in the presence of 0.72 part of maleic anhydride. The solvents employed are 135 parts of xylene, giving a product having a solids content of about 50 percent and a Gardner-Holdt viscosity of W to Y.

EXAMPLE E

An interpolymer is prepared from the following components:

| | Parts by weight |
|---|---|
| N-butoxymethyl acrylamide | 132 |
| Styrene | 360 |
| Methyl methacrylate | 93 |
| Methacrylic acid | 15 |
| t-Dodecyl mercaptan | 9 |
| Azobis(isobutyronitrile) | 6 |

A vessel is charged with 233 parts of the above mixture, along with 172 parts of xylene, 202 parts of toluene and 63 parts of butanol, and heated to reflux over a one-hour period and then 4 parts of azobis(isbutyronitrile) and 80 parts of toluene are added over a three-hour period. Reflux is maintained for one more hour, then the mixture is cooled and 69 parts of toluene added. The resulting resinous product has a solids content of 50 percent and a Gardner-Holdt viscosity of R to U.

The above amide interpolymers are formulated into coating compositions having the desirable properties described herein, as illustrated by the following:

EXAMPLE 1

In this example, a commercially available aliphatic hydrocarbon wax modified with polyethylene oxide was employed, known as Hoechst Wax "V" (sometimes Gersthofen Wax "V"). It is understood to be an ethylene oxide-modified aliphatic hydrocarbon wax containing about 15 percent by weight of polyethylene oxide groups. Its infra-red spectrum shows sharp bands at 3.4, 6.9, 7.2 and 13.9 microns, and a relatively broad band at 9 microns; its elemental analysis showed that it contains 80.75 percent carbon, 13.42 percent hydrogen and 5.48 percent oxygen. It is white in color, with a melting point of about 48° C. This wax was used in a coating composition produced by mixing the following:

| | Parts by weight |
|---|---|
| Amide interpolymer composition of Example A (50 percent solids) | 498.5 |
| Wax "V" (as a 50 percent solution in xylene) | 1.5 |
| Epoxy resin [1] (as a 65 percent solution in toluene) | 26 |
| Polyethylene (as a 10 percent solution in xylene) | 5 |
| Resinous curing catalyst [2] (50 percent solids) | 56 |
| Silicone fluid (SF-1023) | 0.5 |
| Pigment paste | 162 |

[1] Reaction product of Bisphenol A and epichlorohydrin having epoxide equivalent of 450–525 and molecular weight of 900–1000 (Epon 1001).
[2] Adduct of maleic anhydride and styrene-allyl alcohol copolymer made in accordance with Example VIII of U.S. 3,118,853.

The pigment paste employed in the above coating composition had the following composition:

| | Parts by weight |
|---|---|
| Amide interpolymer composition of Example A (50 percent solids) | 45 |
| Titanium dioxide | 37 |
| Xylene | 25 |
| Red iron oxide | 14 |
| Yellow iron oxide | 37 |
| Resinous curing catalyst (as above) | 4 |

The coating composition also included 15 parts of butyl Carbitol, 20 parts of aromatic naphtha (B.P. 160–173° C.) and 25 parts of diacetone alcohol. It was applied to primed steel parts using a Ransbury electrostatic reciprocating bell apparatus; no bubbles were encountered and the parts after painting were entirely smooth.

By way of comparison another coating composition, made in the same manner except that only the Wax "V" employed above was omitted, was applied in the same manner to the same parts. Numerous bubbles were encountered and the painted parts showed numerous defects due to bubbles being deposited thereon. These defects were eliminated completely in those parts painted with compositions in accordance with the invention herein.

EXAMPLE 2

Following the foregoing procedures, a coating composition was produced using the following materials:

| | Parts by weight |
|---|---|
| Amide interpolymer composition of Example E (50 percent solids) | 568 |
| Wax "V" (50 percent solution in toluene) | 1.5 |
| Methylol phenol ether composition [1] | 39 |
| Epoxy resin solution (as in Example 1) | 60 |
| Isophorone | 10 |
| Pigment paste | 246.6 |

[1] Mixture of the allyl ethers of mono-, di- and trimethylol phenols with the trimethylol derivative predominating.

The pigment paste had the following composition:

| | Parts by weight |
|---|---|
| Composition of Example E (50 percent solids) | 58.6 |
| TiO$_2$ | 150 |
| Carbon black | 1.6 |
| Aromatic naphtha (B.P. 160–173° C.) | 22 |
| Isophorone | 14.5 |

This composition was reduced with a mixture of 95 parts of aromatic naphtha and 5 parts of isophorone to a viscosity of 22 seconds, #2 Zahn cup. It was then flow-coated onto phosphated steel parts with highly successful results.

For comparison, a corresponding composition was made and used in the same manner, except that the Wax "V" was omitted; numerous bubbles were deposited on the coated parts and many of these bubbles remained and caused defects in the finished parts. This problem is completely overcome by the composition above using Wax "V"; relatively few bubbles form and those which do form quickly break, leaving a smooth finished coating.

In a similar manner, correspondingly good results are obtained with other compositions in addition to those specifically exemplified, employing, for instance, other polyalkylene oxide modified hydrocarbon waxes of the class disclosed, as well as other amide interpolymers, such as those of Examples B, C and D herein.

Also, while it is preferred to employ minor amounts (e.g. up to 30 percent of the resinous vehicle) of epoxy resins, such as those described and others as disclosed, for instance, in U.S. Patents 2,870,117 and 3,315,011, and small amounts of resinous curing catalysts, such as are described in U.S. Patents 3,118,852 and 3,118,853, such additive materials can be omitted, or other added or coreacted materials can be included. Such other materials can be, for example, amine resins, for instance, those described in U.S. Patent 3,050,495; organopolysiloxanes, such as those in U.S. Patent 3,261,881; alkyds, as in U.S. 2,940,945; and others.

It can be noted that the polyalkylene oxide-modified hydrocarbon wax employed herein provides apparently unique results which are not obtained with other materials, including those which might be expected to have a similar effectiveness. Tests of a number of materials have shown that they do not provide the desired results; these included a number of silicones, e.g., silicone fluids and surfactants; waxes such as Chlorowax 70, polyethylene wax etc.; paraffins, such as petrolatum; commercial slip and flow agents, such as those known as "Modaflow" and "Mojell;" and others. Thus, the effectiveness of the modified hydrocarbon wax herein is highly unexpected as well as highly advantageous.

According to the provisions of the patent statutes, there are described above the invention and what are now considered to be its best embodiments. However, within the scope of the appended claims, it is to be understood that the invention can be practiced otherwise than as specifically described.

I claim:

1. A thermosetting resinous coating composition comprising
   (1) an interpolymer of an unsaturated carboxylic acid amide and at least one other polymerizable ethylenically unsaturated monomer, said interpolymer being characterized by containing amido groups having a hydrogen atom replaced by the structure:

where R is selected from the group consisting of hydrogen and lower alkyl radicals, and $R_1$ is selected from the group consisting of hydrogen and alkyl and aryl radicals, and
   (2) from about 0.05 to about 5 percent, based on the total weight of the resinous components of polyalkylene oxide-modified aliphatic hydrocarbon wax having an alkylene oxide content of from about 3 percent to about 40 percent by weight.

2. The composition of claim 1 in which said interpolymer is characterized by containing amido groups having a hydrogen atom replaced by the structure:

$$-CH_2OR_1$$

where $R_1$ is lower alkyl.

3. The composition of claim 2 in which said unsaturated carboxylic acid amide is acrylamide.

4. The composition of claim 2 in which said structure is a butoxymethyl group.

5. The composition of claim 2 in which at least about 50 percent of the amido groups have a hydrogen atom replaced by the structure:

$$-CH_2OR_1$$

where $R_1$ is lower alkyl.

6. The composition of claim 1 in which said wax is modified with polyethylene oxide.

7. The composition of claim 1 in which said wax is present in an amount between about 0.05 and about 5 percent of the total weight of resinous components in the composition.

8. The composition of claim 1 in which said wax is an aliphatic hydrocarbon wax modified with between about 10 percent and about 20 percent by weight of ethylene oxide and said wax is present in an amount between about 0.08 and 1 percent of the total weight of resinous components in the composition.

9. The composition of claim 1 in which there is included as an added resinous component an epoxy resin.

10. A method of coating which comprises applying to a substrate a layer of a thermosetting coating composition comprising
    (1) an interpolymer of an unsaturated carboxylic acid amide and at least one other polymerizable ethylenically unsaturated monomer, said interpolymer being characterized by containing amido groups having a hydrogen atom replaced by the structure:

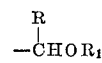

where R is selected from the group consisting of hydrogen and lower alkyl radicals, and $R_1$ is selected from the group consisting of hydrogen and alkyl and aryl radicals, and
    (2) from about 0.05 to about 5 percent based on the total weight of the resinous components, of polyalkylene oxide-modified aliphatic hydrocarbon wax having an alkylene oxide content of from about 3 percent to about 40 percent by weight.

11. The method of claim 10 in which said coating is applied by flow-coating.

12. The method of claim 10 in which said coating is applied by electrostatic spraying.

References Cited

UNITED STATES PATENTS

| | | | |
|---|---|---|---|
| 3,037,963 | 6/1962 | Christenson | 260—72 |
| 3,079,434 | 2/1963 | Christenson | 260—72 |

OTHER REFERENCES

Warth, "Chemistry and Technology of Waxes," Reinhold Pub., 1956, p. 462.

MORRIS LIEBMAN, Primary Examiner

P. R. MICHL, Assistant Examiner